United States Statutory Invention Registration [19]

[11] Reg. Number: H581

Collignon et al.

[43] Published: Feb. 7, 1989

[54] MINERAL SPIRITS PURIFICATION PROCESS

[75] Inventors: Steven L. Collignon, Waldorf; Dennis R. Knudsen, Fredericksburg, both of Md.

[73] Assignee: The United States of America as represented by the Secretary of the Navy, Washington, D.C.

[21] Appl. No.: 71,502

[22] Filed: Jul. 9, 1987

[51] Int. Cl.[4] ..... C10G 17/00

[52] U.S. Cl. ..... 208/254 R; 208/14; 208/184

*Primary Examiner*—Richard D. Lovering
*Assistant Examiner*—Susan Wolffe
*Attorney, Agent, or Firm*—K. E. Walden; Roger D. Johnson

[57] ABSTRACT

A process for purifying mineral spirits which have been used to clean Otto Fuel II propelled torpedoes by heating the mineral spirits to decompose 1,2-propanediol dinitrate and remove hydrogen cyanide and other gaseous decomposition produces, and then distill the mineral spirits from the remaining contaminants.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

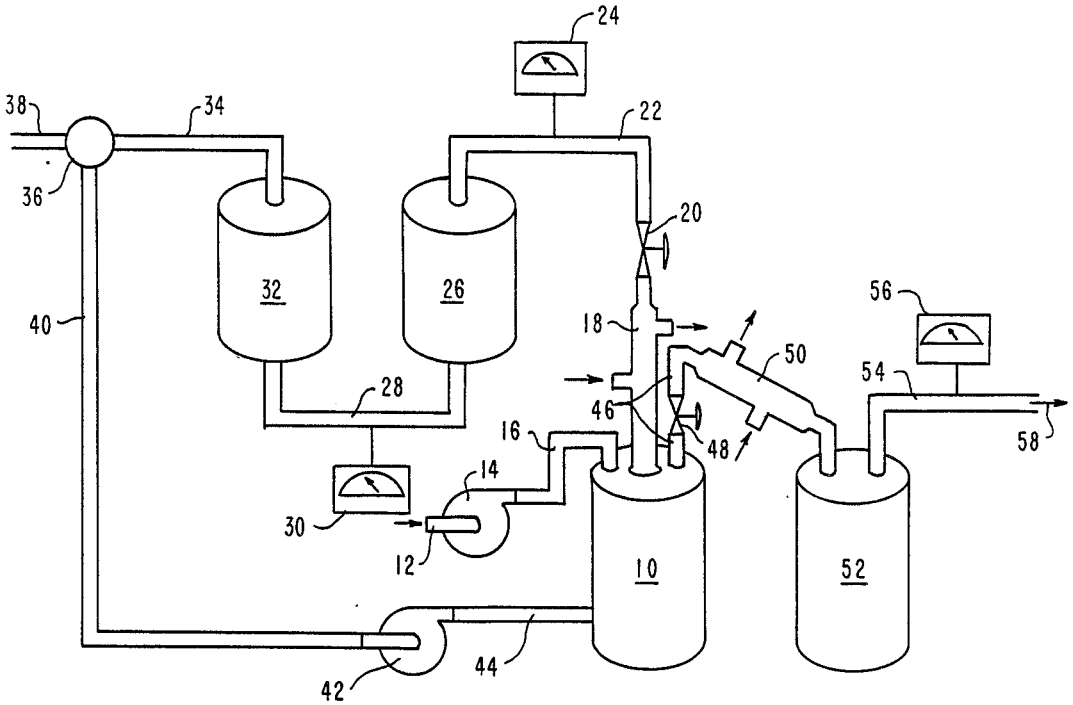
24
38
34
22
36
20
32
26
56
40
18
50
54
28
46
16
48
58
14
30
12
10
52
44
42

MINERAL SPIRITS PURIFICATION PROCESS

BACKGROUND OF THE INVENTION

This invention relates to mineral spirits and more particularly to the reclamation of contaminated mineral spirits.

Organic solvents have become commonplace in Department of Defense (DOD) installations for the removal of grease, dirt, and other contaminants from metal surfaces. The widely accepted methods of disposal have been incineration and deep well injection but, as a result of increasingly strict pollution regulations and the rising cost of solvents, the DOD has been directed to investigate recycling rather than disposal.

In one application, 92.3 percent mineral spirits (Federal Specification TT-T-291 Type III) and 7.7 percent preservative oil (WS 12953, TECTYL Q1449A) are used in cleaning baths as part of a postrun maintenance operation for torpedoes. As torpedoes pass through these cleaning baths, grease and dirt as well as Otto Fuel II (torpedo propellant) and hydrogen cyanide (HCN), a combustion product of Otto Fuel II, accumulate. Otto Fuel II is composed of 76 weight percent of 1,2-propanediol dinitrate (PGDN), 22.5 weight percent of dibutyl sebecate (that is dibutyl decanedioate), and 1.5 weight percent of 2-nitrodiphenylamine. Simple distillation produces a mineral spirit distillate which is still contaminated with 1,2-propanediol dinitrate and hydrogen cyanide. A process for recovering the mineral spirits free of Otto Fuel II and hydrogen cyanide is needed. Preferably such a process should not require chemical reagents.

SUMMARY OF THE INVENTION

Accordingly, an object of this invention is to provide a new method of purifying mineral spirits.

Another object of this invention is to provide a method of removing Otto Fuel II and hydrogen cyanide from mineral spirits.

A further object of this invention is to remove Otto Fuel II and hydrogen cyanide from mineral spirits without the use of chemical reagents.

These and other objects of this invention are accomplished by providing a method of treating Otto Fuel II and hydrogen cyanide contaminated mineral spirits by (1) removing 1,2-propanediol dinitrate and hydrogen cyanide by simultaneously
  - (a) heating the contaminated mineral spirits in a partially filled vessel at a temperature of from about 145° C. to the reflux temperature of the mineral spirits at atmospheric pressure to
    - (i) decompose the 1,2-propanediol dinitrate to gaseous decomposition products including hydrogen cyanide and nitrogen oxides and
    - (ii) drive the gaseous decomposition products from the mineral spirits into open portion of the vessel,
  - (b) purging the gaseous decomposition products from the vessel with a stream of a carrier gas, and
  - (c) removing the hydrogen cyanide and nitrogen oxides from the carrier gas;

and when the concentration of 1,2-propanediol dinitrate in the mineral spirits has been reduced to an acceptable level, (2) recovering the mineral spirits from the vessel by distillation.

BRIEF DESCRIPTION OF THE DRAWING

A more complete understanding of the invention and of many of the attendant advantages thereof will be readily appreciated as the same becomes better understood by reference to the accompanying drawing in which the sole figure schematically illustrates a typical apparatus which may be used for this process.

DETAILED DESCRIPTION OF THE PREFERRED EMBODIMENT

The present process provides a means of reclaiming the mineral spirits from a cleaning mixture of mineral spirits and a preservative oil which has been used to clean Otto Fuel II propelled torpedoes. The cleaning mixture which is commonly used contains 92.3 weight percent of mineral spirits (Federal Specification TT-T-291 Type III) and 7.7 weight percent preservative oil (WS 12953, TECTYL Q1449A). As torpedoes pass through these cleaning baths, grease and dirt as well as Otto Fuel II and hydrogen cyanide accumulate. Otto Fuel II is composed of 22.5 weight percent of dibutyl sebecate (that is dibutyl decanedioate), 1.5 weight percent of 2-nitrodiphenylamine, and 76.0 weight percent of propylene glycol dinitrate (1,2-propanediol dinitrate) as the energetic component.

The mineral spirits can be separated from the preservative oil, grease, dirt, dibutyl sebecate, and 2-nitrodiphenylamine by distillation. However, the distillate will be contaminated with hydrogen cyanide and 1,2-propanediol dinitrate.

In the present process the used cleaning mixture is heat soaked to decompose the 1,2-propanediol dinitrate into gaseous decomposition products such as HCN, $N_2$, $NO_2$, $CO_2$, $H_2O$, etc. prior to the distillation. The step is carried out a ambient pressure and at a temperature of from 145° C. to reflux, preferably from 160° C. to reflux, more preferably from 175° C. to reflux, and most preferably at reflux, wherein the reflux temperature of the mineral spirits at atmospheric or ambient pressure is greater than 180° C.

Although 1,2-propanediol dinitrate begins to decompose at 145° C., the rate is not very practical below 160° C. and it is desirable to operate at a temperature 175° C. or more, especially for larger batches. The fastest rate of decomposition in a non-pressurized system is achieved at reflux. The rate of decomposition decreases as the process is scaled up, making the higher temperatures even more desirable.

During this decomposition step, a stream of a suitable gas (such as air or nitrogen) is used to sweep the gaseous decomposition products (HCN, $NO_2$, NO, $H_2O$, $CO_2$, etc) out of the batch distillation vessel. The rate of flow is adjusted to remove the gaseous decomposition products without removing the heavier mineral spirits vapor. The gas stream is filtered to remove the HCN, nitrogen oxides, and any other noxious gases.

Referring to the figure, the decomposition step may be described as follows. The contaminated cleaning mixture of mineral spirits and preservative oil is put in the batch distillation vessel 10 and heated to the desired temperature (preferably reflux). Cut off valve 48 on line 46 is shut to prevent the distillation of the mineral spirits. The water cooled reflux condenser 18 condenses the mineral spirit vapors and the condensate returns to the batch distillation vessel 10. The air intake 12 is opened and the air intake pump 14 is turned on forcing air through air line 16 into the batch distillation g vessel 10.

Shut off valve 20 is opened and two-way valve 36 is set to open the air purge vent 38 and close off air line 40. The air stream flows out of the batch distillation. vessel 10 through the reflux condenser 18, shut off valve 20, and air line 22 to the carbon adsorber 26. An optional cyanide detector 24 may be used to monitor air line 22 and thus determine the progress of the decomposition of 1,2-propanediol dinitrate. The carbon adsorber 25 is used to remove the HCN and nitrogen oxides. The air stream flows from the carbon adsorber 26 through an air line 28, a backup carbon adsorber 32, air line 34, two-way valve 36, and out of the air purge vent 38. A cyanide detector 30 monitors the output of the carbon adsorber 26.

The equipment can be operated during the eecomposition step as a closed system by turning the two-way valve 36 so that air line 34 feeds into air line 40 and the air purge vent 38 is shut off. The air intake 12 is shut and the air intake pump 14 is turned off. Air line 40 feeds circulation pump 42 which is turned on. The output of circulation pump 42 is connected by air line 44 to the batch distillation vessel 10. The result is a closed system in which air flows through the batch distillation vessel 10, reflux condenser 18, shut off valve 20, air line 22, carbon adsorber 26, air line 28, carbon adsorber 32, air line 34, two-way valve 36, air line 40, operating circulation pump 42, air line 44, and back into the batch distillation vessel 10.

The progress of the decomposition of the 1,2-propanediol dinitrate can be monitored by the hydrogen cyanide detector 24 or by analyzing samples from the distillation vessel 10. The decomposition is continued until an acceptable level of 1,2-propanediol dinitrate is achieved. Preferably the concentration of 1,2-propanediol dinitrate will be less than 2.0 mg/L, more preferably less than 0.5 mg/L, and still more preferably less then 0.2 mg/L.

After the concentration of 1,2-propanediol dinitrate has been reduced to an acceptable level, the mineral spirits are distilled off, leaving a residue of the high boiling preservative oil, grease, dirt, 2-nitrodiphenylamine, dibutyl sebecate, and decomposed materials behind. Referring to the figure, the distillation can be described as follows. The recycling pump 42 and air intake pump 14 are turned off, the air intake 12 is shut, and the shut off valve 20 is closed. This closes down the decomposition portion of the system. The distillation is begun by opening shut off valve 48. Mineral spirit vapors pass through the distillation line 46 and shut off valve 48 into the water cooled heat exchanger 50 where they are condensed to a liquid which is collected in the distillate vessel 52. The distillation may be carried out under vacuum. The batch distillation vessel 10, distillation line 46, heat exchanger 50, and distillate vessel 52 are connect by vacuum line 54 to a vacuum source 58 (for example, a vacuum pump not shown). A vacuum gauge 56 measures the vacuum in the system.

The distilled mineral spirits are mixed with fresh preservative oil to form a new cleaning mixture.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

500 ml of contaminated mineral spirit solvent mixture were added to a 1 liter round-bottom flask. The mineral spirit solvent mixture was made up of 92.3 weight percent of mineral spirits (Federal Specification TT-T-291 Type III) and 7.7 weight percent of preservative oil (WS 12953, TECTYL Q1449A). The mineral spirit solvent mixture was contaminated with Otto Fuel II to give a 72.6 mg/L concentration of 1,2-propanediol dinitrate. The 1 liter flask was attached to a rotary evaporator with a cooling water source. The glass rotary evaporator and cooling water were turned on. A hot oil bath was placed under the rotating flask containing the contaminated mineral spirits. A vacuum source (water aspirator) and gauge were used to reduce the pressure in the rotary evaporator to 8 mm. The hot oil bath was heated slowly, thereby heating the 500 ml of contaminated mineral spirits. The vaporized mineral spirits were cooled and then collected in a 1 liter round bottom receiving flask. The vacuum pressure was adjusted to allow a smooth flow of distillate to come over (3 to 8 mm Hg) until approximately 10 percent was left in the rotating flask.

The appearance of the recovered mineral spirits was clear and colorless, equivalent to that of the original solvent. The recovered mineral spirits was analyzed with a Hewlett Packard 5880A gas chromatograph. The conditions used for this analysis are listed in Table 1.

TABLE 1

GAS CHROMATOGRAPH CONDITIONS

| Test Element | Test Condition |
|---|---|
| Oven temperature | 95° C. |
| Injection temperature | 120° C. |
| Detector temperature | 145° C. |
| Detector | Flame ionization detector (FID) |
| Carrier gas | Helium at 30 ml/min |
| FID gases | Air at 430 ml/min and hydrogen at 30 ml/min |
| Glass column | 6 ft × ¼ in.; 3 percent SE-30 on 80/100 mesh chromosorb WHP |

Under these conditions, it was determined that the gas chromatograph traces of recovered mineral spirits matched the trace of the original mineral spirits. To determine whether Otto Fuel II was present in the recovered mineral spirits, an electron capture detector was used in place of the flame ionization detector (FID) and the carrier gas was 95 percent argon/5 percent methane. The response of the gas chromatograph was determined by using several solutions of varying concentrations of neat Otto Fuel II in either hexane or benzene. The concentration of 1,2-propanediol dinitrate the major constituent in Otto Fuel II, was reduced only a small amount—from 72.6 mg/L in the contaminated solvent to 45.1 mg/L after recovery.

EXAMPLE 2

1. 100 ml of contaminated mineral spirits (same composition as in example 1) was added to each of the four 250 ml round-bottomed flasks.

2. In flask 1, no chemicals were added. In flask 2, 0.2 ml $HNO_3$ was added. In flask 3, 0.2 ml 15M sodium hydroxide (NaOH) was added, and in flask 4, 15 ml of 2N NaOH was added.

3. A piece of cyanide test paper was placed at the outlet of the condenser to detect the passage of HCN. The test paper changes from pale green to blue; the darkness of the blue increases with increasing cyanide concentrations. Concentrations of cyanide as low as 0.2 mg/L can be detected after 15 minute reaction time. High concentrations will turn the paper blue within seconds of exposure.

4. While being agitated and heated slowly, solutions 1 through 3 were brought to boiling (186° C.). The solutions were allowed to reflux for approximately 1 hr. Solution 4 was heated to 90° C. for 10 min. All of the solutions were allowed to cool.

The test results are listed in Table 2. The initial concentration of the contaminated mineral spirits (72.6 mg/L) decreased in tests 1 through 3. The concentration in test 4 was only reduced by 34 percent. This was possibly due to the short heating time and low temperature. During test 2, brown fumes were released, indicating decomposition of nitric acid. This occurred a few minutes before the solution began to reflux.

TABLE 2

PGDN ANALYSES AFTER TREATMENT

| Solution Number | Chemical Treatment | Concentration of PGDN (mg/L) |
|---|---|---|
| 1 | None | 0.0 |
| 2 | 0.2 ml concentrated $HNO_3$ | 0.0 |
| 3 | 0.2 ml 15 M NaOH | 0.1 |
| 4 | 15 ml 2 N NaOH | 47.4 |

1,2-propanediol dinitrate can effectively be destroyed through heating at elevated temperatures. This appears to be independent of the chemical treatments that were attempted. The concentration used (72.6 mg/L) was a result of three torpedo flushings. It was hoped that the chemical treatments in experiments 3 and 4 would also eliminate the HCN in the solution (99.1 mg/L), but this was not the case. HCN was detected in all of the samples as they reached 90° to 120° C. Therefore, there appears to be no advantage to using chemical reagents in the process.

EXAMPLE 3

Samples of spent (contaminated) mineral spirit cleaning mixture were heated to various temperatures to determined the decomposition of the 1,2-propanediol dinitrate (PGDN). The result are contained in table 3.

TABLE 3

1-2-PROPANEDIOL DINITRATE

| Temperature (°C.) | Time (min) | Initial Concentration (mg/L) | Final Concentration (mg/L) |
|---|---|---|---|
| 120 | 30 | 44.6 | 41.8 |
| 150 | 30 | 44.6 | 3.4 |
| 170 | 5 | 65.4 | 9.3 |
| 170 | 30 | 65.4 | <0.5 |
| 191 (refluxed) | 5 | 44.6 | <0.5 |
| 191 (refluxed) | 30 | 44.6 | <0.5 |
| 191 (refluxed) | 30 | 9.2 | <0.5 |
| 191 (refluxed) | 60 | 44.6 | <0.5 |
| 191 (refluxed) | 60 | 9.2 | <0.5 |

The best results were obtained when the mineral spirits were refluxed at 191° C. Rapid decomposition did not begin until the temperature reached the 150° C. range.

EXAMPLE 4

The rate of 1,2-propanediol dinitrate decomposition at 160° C. was next examined. This temperature was chosen because preliminary information indicated that this was a maximum temperature to which commercial distillation units were able to heat a solvent. Later investigation showed this temperature to be 177° C. for most commercial stills. Samples of synthetic spent mineral spirits were prepared in the laboratory for these trials. The synthetic waste was mineral spirits and TECTYL Q1449A oil spiked with neat Otto Fuel II. The results are contained in Table 4.

TABLE 4

(at 160° C.)
1,2-propanediol dinitrate

| Time (minutes) | Initial Concentration (mg/L) | Final Concentration (mg/L) |
|---|---|---|
| 5 | 1424.8 | 928.2 |
| 10 | " | 668.9 |
| 15 | " | 416.3 |
| 20 | " | 465.1 |
| 25 | " | 459.5 |
| 30 | " | 309.2 |
| 30 | 938.4 | 252.6 |
| 35 | " | 217.5 |
| 40 | " | 221.1 |
| 45 | " | 209.1 |
| 50 | " | 185.0 |

EXAMPLE 5

The distillation units being considered for the recovery system have a holding capacity of 35 and 60 gal (132 and 227 L). The large volume will increase the time required to achieve the desired decomposition of 1,2-propanediol dinitrate (PGDN). Two different volumes of synthetic spent mineral spirits were refluxed between 165° C. and 170° C. to see how significant this increase may be (Table 5).

TABLE 5

| Sample Volume | Sample Time | PGDN Concentration (mg/L) |
|---|---|---|
| 100 ml | 0 min | 989.9 (stock) |
| 100 ml | 10 min | 13.6 |
| 100 ml | 20 min | 5.7 |
| 800 ml | 0 min | 989.9 (stock) |
| 800 ml | 10 min | 158.0 |
| 800 ml | 20 min | 49.2 |

The results from Tables 4 and 5 indicate that 160° C. is too low a temperature for the decomposition step of the process. After 50 minutes there was an 80 percent destruction of the PGDN. This would not provide sufficient decomposition of PGDN in a distillation unit which has a significantly greater volume than laboratory scale glassware used. The results from Table 5 show that increasing the volume will increase the time required for sufficient removal of the PGDN. The exact effect of the volume of spent solvent in the distillation unit cannot be determined from laboratory experiments since the heat transfer characteristics of the still will be different than those of lab-scale units.

EXAMPLE 6

The boiling point of the contaminated mineral spirits is approximately 191° C. This temperature will provide the maximum decomposition of 1,2-propanediol dinitrate (PGDN). A sample of spent mineral spirits from NWS Yorktown was spiked with Otto Fuel II to increase its PGDN concentration. Samples of this waste were refluxed at various time intervals to examine the decomposition of PGDN at 191° C. The results are contained in Table 6.

TABLE 6

(at reflux, 191° C.)

| Sample | PGDN Concentration (mg/L) |
|---|---|
| Stock | 597.0 |
| Refluxed for 5 min | 17.4 |
| Refluxed for 10 min | <2.0 |
| Refluxed for 20 min | <2.0 |
| Refluxed for 30 min | <2.0 |

The PGDN was rapidly decomposed at this temperature. For the optimum decomposition of PGDN the thermal treatment step of the process should be operated at the normal boiling point of the solvent. The time required for sufficient removal of the PGDN should be determined from trials with the actual distillation unit.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. A method of purifying mineral spirits contaminated with 1,2-propanediol dinitrate and hydrogen cyanide comprising:

(1) removing the 1,2-propanediol dinitrate and hydrogen cyanide by simultaneously (a) heating the contaminated mineral spirits in a partially filled vessel at a temperature of from about 145° C. to the reflux temperature of the mineral spirits at atmospheric pressure to (i) decompose the 1,2-propanediol dinitrate to gaseous decomposition products including hydrogen cyanide and nitrogen oxides and (ii) drive the gaseous decomposition products from the mineral spirits into open portion of the vessel, (b) purging the gaseous decomposition products from the vessel with a stream of a carrier gas, and (c) removing the hydrogen cyanide and nitrogen oxides from the carrier gas;

and when the concentration of 1,2-propanediol dinitrate in the mineral spirits has been reduced to an acceptable level, (2) recovering the mineral spirits from the vessel by distillation.

2. The process of claim 1 wherein the temperature in step (1) is from 160° C. to the reflux temperature.

3. The process of claim 2 wherein the temperature in step (1) is from 175° C. to the reflux temperature.

4. The process of claim 3 wherein the temperature in step (1) is the reflux temperature.

5. The process of claim 1 wherein the carrier gas is air.

6. The process of claim 1 wherein the hydrogen cyanide and nitrogen oxides are removed from the carrier gas by carbon adsorbers.

7. The process of claim 1 wherein step (1) is terminated after the concentration of 1,2-propanediol dinitrate in the mineral spirits has been reduced to less than 2.0 mg/L.

8. The process of claim 7 wherein step (1) is terminated after the concentration of 1,2-propanediol dinitrate in the mineral spirits has been reduced to less than 0.5 mg/L.

9. The process of claim 8 wherein step (1) is terminated after the concentration of 1,2-propanediol dinitrate in the mineral spirits has been reduced to less than 0.2 mg/L.

* * * * *